June 26, 1956 H. R. FOSTER ET AL 2,752,492

HIGH FREQUENCY MARKER

Filed Feb. 16, 1954

INVENTORS
HARRY R. FOSTER
ELMO E. CRUMP
BY A. D. T. Libby
ATTORNEY

United States Patent Office 2,752,492

Patented June 26, 1956

2,752,492

HIGH FREQUENCY MARKER

Harry R. Foster, Lake Valhalla, and Elmo E. Crump, West Caldwell, N. J., assignors to Ohmega Laboratories, Pine Brook, N. J., a partnership Application February 16, 1954, Serial No. 410,561

4 Claims. (Cl. 250—36)

This invention relates to a new high frequency marker generator for use in connection with television instruments. With the advent of ultra high frequency channels many new problems presented themselves, one of which is the development of various instruments required to ascertain the character of passbands that were being broadcast. The ultra high frequency channels are 70 in number and start at 470 megacycles and end at 890 megacycles. Each of these channels is 6 megacycles in width and each includes a picture carrier and a sound carrier. It is necessary to generate markers at a total of 140 separate frequencies. A consideration of the location of the sound and picture carrier frequencies throughout this ultra high frequency range shows that no simple arithmetical relationship exists. Thus the picture carrier of the lowest ultra high frequency channel is at 471.25 megacycles, the sound carrier at 475.75 megacycles. The next highest channel has its picture carrier at 477.25, the sound carrier at 481.75.

The use of a separate crystal for the generation of each marker desired would lead to a complex and expensive instrument employing 140 crystals. Our invention employs one single crystal so selected in frequency as to have zero error at the center channel and only a slight error at channels either side of center. This small residual error can be reduced to zero by mechanically linking the tuning control of the sweeping oscillator to a variable capacitance which is placed in the crystal oscillator circuit so as to exert a very small change in frequency on the crystal oscillator frequency so that as the sweeping oscillator is tuned over the ultra high frequency region the exact frequencies may be obtained on all channels.

If the television set has not been aligned with particular attention to the passband as related to the sound and picture carriers, then the picture on the TV set is poor. Therefore, one of the objects of our invention is to produce a high frequency marker generator for determining precisely where these two carriers are positioned in any of the channels above referred to. A further object of this invention is to generate the desired number of marks (140) from one crystal.

Our invention is shown in the attached drawing wherein.

Figure 1:
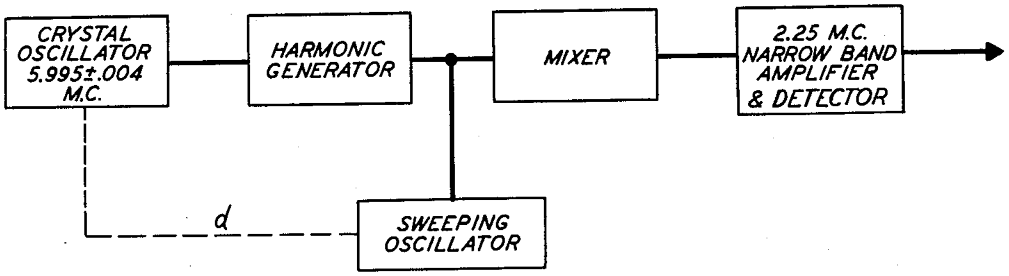
Figure 1 shows a circuit arrangement which includes a crystal oscillator which oscillates at a nominal frequency of 5.995 megacycles.
Figure 2:
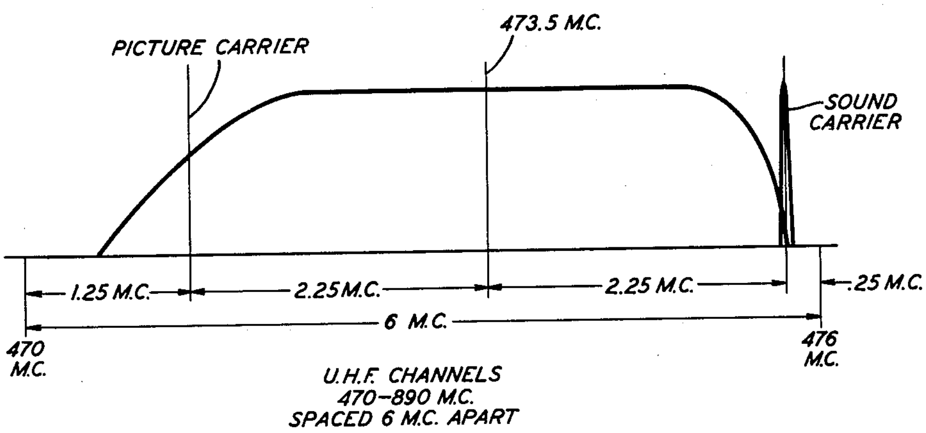
Figure 2 shows a passband wherein our generator will identify and show the location of the two carriers.

In Figure 1 the crystal oscillator is multiplied in a harmonic generator so as to furnish energy at each harmonic multiple within the ultra high frequency spectrum. The 79th harmonic of 5.995 megacycles falls very close to the 473.5 megacycle frequency desired in the lowest ultra high frequency channel as shown in Figure 2. This 473.5 megacycle frequency is desired because it is in the exact center between the picture carrier frequency of 471.25 megacycles and the sound carrier frequency of 475.75 megacycles.

The 114th harmonic of 5.995 megacycles is at 683.5 megacycles which is the exact center of the picture and sound carriers in the 36th from the lowest ultra high frequency channel.

The 148th harmonic of 5.995 megacycles is very close to the desired 887.5 megacycles which is the exact center of the picture and sound carrier in the highest ultra high frequency channel.

A return to Figure 2 and a description of the functioning of the circuit for this channel will illustrate how this invention operates in each of the 70 channels.

The mixer shown in Figure 1 has two inputs: (1) energy at 473.5 megacycles from the harmonic generator and (2) energy from the sweeping oscillator.

As the frequency of the sweeping oscillator passes the picture carrier frequency 471.25 it will beat in the mixer with the 473.5 megacycle input to produce output at 2.25 megacycles. This 2.25 megacycle energy will pass through the narrow band amplifier and detector to generate a marker pulse which will accurately mark the desired picture carrier. As the sweeping oscillator passes the 475.75 megacycle point it will beat with the 473.5 megacycle input to produce an output at 2.25 megacycles and generate the desired mark at the sound carrier frequency. All 140 marks are generated in a similar fashion.

The 5.995 megacycle frequency produces markers which have zero error in the center ultra high frequency channel but small errors of +0.175 megacycle in the lowest channel and −0.170 megacycle in the highest channel. This error may be reduced to zero all over the ultra high frequency band by a linkage between the tuning control of the sweeping oscillator and a capacitance in the crystal oscillator circuit. Thus a small tuning condenser may be placed in series with the quartz crystal which controls the frequency of 5.995 so as to drop the frequency to 5.9936 megacycles at the lowest ultra high frequency channel and to raise the frequency to 5.9967 megacycles at the highest ultra high frequency channel. Line *d* shows the mechanical linkage between the sweeping oscillator tuning control and the tuning or pulling condenser in the crystal oscillator. From the foregoing it will be seen that crystal controlled oscillators may be pulled slightly off normal operating frequency by variation in the shunt or series reactance.

From our study and investigation of this subject we have found that our system as shown and described herein is far superior to all others which we have investigated and have found many of them to be inaccurate and all expensive and complicated.

Having thus described our invention, what we claim is:

1. In the ultra high frequency channels used in television work now ranging from 470 megacycles to 890 megacycles, means comprising an arrangement of these frequencies and deviations thereof for producing markers on a passband curve from any of said television channels by showing the location of the picture and sound carriers, said apparatus including a circuit arrangement having a single crystal oscillator delivering approximately 5.995 megacycles and connected to a harmonic generator and mixer to which is connected a sweeping oscillator and a 2.25 megacycle narrow band amplifier, the output of the circuit delivering markers for showing the location of the picture and sound carriers.

2. A marker system comprising a crystal oscillator providing an output of 5.995 megacycles connected to the tuning of a sweeping oscillator adapted to pull the frequency of the crystal oscillator slightly above or below its nominal frequency, a harmonic generator connected to the crystal oscillator and being capable of delivering uniform energy throughout the ultra high frequency spectrum, a mixer and a 2.25 megacycle, intermediate frequency amplifier and detector connected for establishing markerpips throughout the ultra high frequency range.

3. A marker system as set forth in claim 2 further defined in that the ultra high frequency channels used in television work now ranging from 470 megacycles to 890 megacycles in 6 megacycle steps and having picture and sound carrier frequencies, means including an arrangement of elements, for determining in any one chosen step in the said range being utilized, the relative location of the said picture and sound carrier frequencies within the television channels, by markers on a passband curve obtained from the frequencies above specified.

4. The marker system as set forth in claim 2 further defined in that the ultra high frequency channels used in television work now ranging from 470 megacycles to 890 megacycles in 6 megacycle steps and having picture and sound carriers, as set forth in claim 3 further defined in that means are provided for determining the proper alignment of the channels in that there will be markers located at the sound and picture carrier frequencies.

References Cited in the file of this patent

UNITED STATES PATENTS 2,679,005 Bataille et al. ............ May 18, 1954